US009009815B2

(12) United States Patent
Pieczul et al.

(10) Patent No.: US 9,009,815 B2
(45) Date of Patent: Apr. 14, 2015

(54) INCREASING CHOSEN PASSWORD STRENGTH

(71) Applicant: International Business Machines Corporation, Armonk, NY (US)

(72) Inventors: Olgierd Stanislaw Pieczul, Dublin (IE); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/842,097

(22) Filed: Mar. 15, 2013

(65) Prior Publication Data

US 2014/0282939 A1 Sep. 18, 2014

(51) Int. Cl.
| | |
|---|---|
| G06F 17/30 | (2006.01) |
| G06F 21/46 | (2013.01) |
| H04L 9/32 | (2006.01) |
| G06F 7/04 | (2006.01) |
| H04L 29/06 | (2006.01) |

(52) U.S. Cl.
CPC ........ *G06F 21/46* (2013.01); *G06F 2221/2117* (2013.01); *H04L 9/3226* (2013.01); *H04L 63/0846* (2013.01); *H04L 63/20* (2013.01); *H04L 63/083* (2013.01); *H04L 2209/26* (2013.01)

(58) Field of Classification Search
CPC ............ G06F 21/46; G06F 2221/2117; H04L 63/083; H04L 2209/26; H04L 63/0846; H04L 63/20; H04L 9/3226
USPC ....................................................... 726/6, 18
See application file for complete search history.

(56) References Cited

U.S. PATENT DOCUMENTS

| | | | |
|---|---|---|---|
| 7,299,359 B2* | 11/2007 | Hurley .......................... | 713/182 |
| 7,367,053 B2 | 4/2008 | Sanai et al. ...................... | 726/6 |
| 7,581,245 B2* | 8/2009 | Rojewski .......................... | 726/6 |
| 7,685,431 B1* | 3/2010 | Mullany ........................ | 713/184 |
| 8,108,932 B2* | 1/2012 | Himberger et al. ............. | 726/25 |
| 2004/0250139 A1* | 12/2004 | Hurley .......................... | 713/202 |
| 2004/0250141 A1* | 12/2004 | Casco-Arias et al. ......... | 713/202 |
| 2005/0114673 A1* | 5/2005 | Raikar et al. .................. | 713/182 |
| 2005/0216771 A1 | 9/2005 | Malcolm .......................... | 726/5 |
| 2005/0235341 A1* | 10/2005 | Stieglitz et al. .................... | 726/5 |
| 2006/0259960 A1* | 11/2006 | Kondo .............................. | 726/6 |
| 2007/0006301 A1* | 1/2007 | Nickell et al. .................. | 726/22 |
| 2008/0072320 A1* | 3/2008 | Hurley ............................ | 726/21 |
| 2008/0216170 A1 | 9/2008 | Sanai et al. ..................... | 726/18 |
| 2009/0150677 A1* | 6/2009 | Vedula et al. ................. | 713/183 |
| 2009/0150971 A1* | 6/2009 | Vedula et al. ..................... | 726/1 |

(Continued)

OTHER PUBLICATIONS

Castelluccia, Claude, Markus Dürmuth, and Daniele Perito. "Adaptive Password-Strength Meters from Markov Models." NDSS. 2012.*

(Continued)

*Primary Examiner* — Michael Simitoski
(74) *Attorney, Agent, or Firm* — VanLeeuwen & VanLeeuwen; Jeffrey S. LaBaw

(57) ABSTRACT

An approach is provided to increase password strength in a group of users. The approach detects a password event corresponding to one of the users. In response to the detected password event, the approach identifies a strength of the user's password and compares it to one or more password strength metrics that correspond to the group of users. The password strength comparison data is then transmitted as feedback back to the user.

20 Claims, 6 Drawing Sheets

(56) References Cited

U.S. PATENT DOCUMENTS

| | | | |
|---|---|---|---|
| 2009/0313696 A1* | 12/2009 | Himberger et al. | 726/22 |
| 2010/0114560 A1* | 5/2010 | Spataro | 704/9 |
| 2010/0154039 A1* | 6/2010 | Carolan | 726/5 |
| 2012/0042364 A1 | 2/2012 | Herbert | 726/6 |
| 2012/0272288 A1* | 10/2012 | Ashbrook et al. | 726/1 |
| 2012/0284783 A1* | 11/2012 | Jakobsson | 726/6 |
| 2013/0269010 A1* | 10/2013 | Wheeler | 726/6 |
| 2014/0068731 A1* | 3/2014 | Belisario et al. | 726/6 |

OTHER PUBLICATIONS

Kelley, Patrick Gage, et al. "Guess again (and again and again): Measuring password strength by simulating password-cracking algorithms." Security and Privacy (SP), 2012 IEEE Symposium on. IEEE, 2012.*

Ur, Blase, et al. "How Does Your Password Measure Up? The Effect of Strength Meters on Password Creation." USENIX Security Symposium. 2012.*

* cited by examiner

INCREASING CHOSEN PASSWORD STRENGTH

TECHNICAL FIELD

The present disclosure relates to an approach that provides community-based password strength feedback to users.

BACKGROUND OF THE INVENTION

Much user authentication in traditional systems relies on user-chosen passwords. The strength of a password in the face of a variety of attacks, from brute force to knowledge-based attacks, continues to be important to prevent unauthorized access of a user account or user data. Techniques that influence users in the strength of their chosen password include enforced password composition policy, lists of banned passwords, feedback on the strength of the password the user is choosing, and providing lists of generated (high-strength) passwords from which the user chooses a password. Most traditional mechanisms rely on restricting users. The feedback on the user's current password strength gives users some transparency into the strength of the choice they are currently making when compared to an algorithm for evaluating the strength of a password against brute force attacks, with the notion that they will chose to get their password to strong (or at least not weak). However, such feedback does not include context of the user community in which the password is used.

SUMMARY

An approach is provided to increase password strength in a group of users. The approach detects a password event corresponding to one of the users. In response to the detected password event, the approach identifies a strength of the user's password and compares it to one or more password strength metrics that correspond to the group of users. The password strength comparison data is then transmitted as feedback back to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
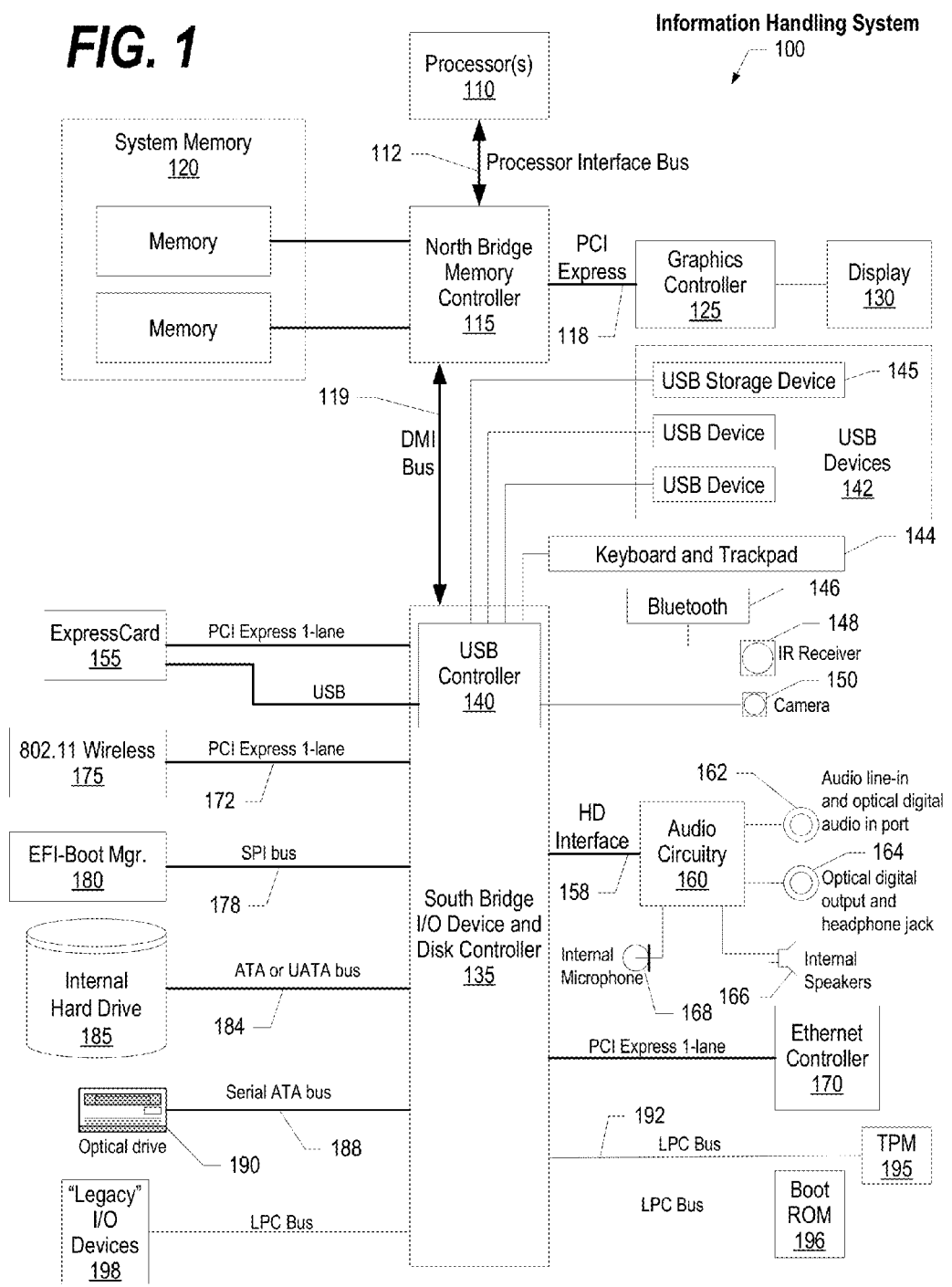
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
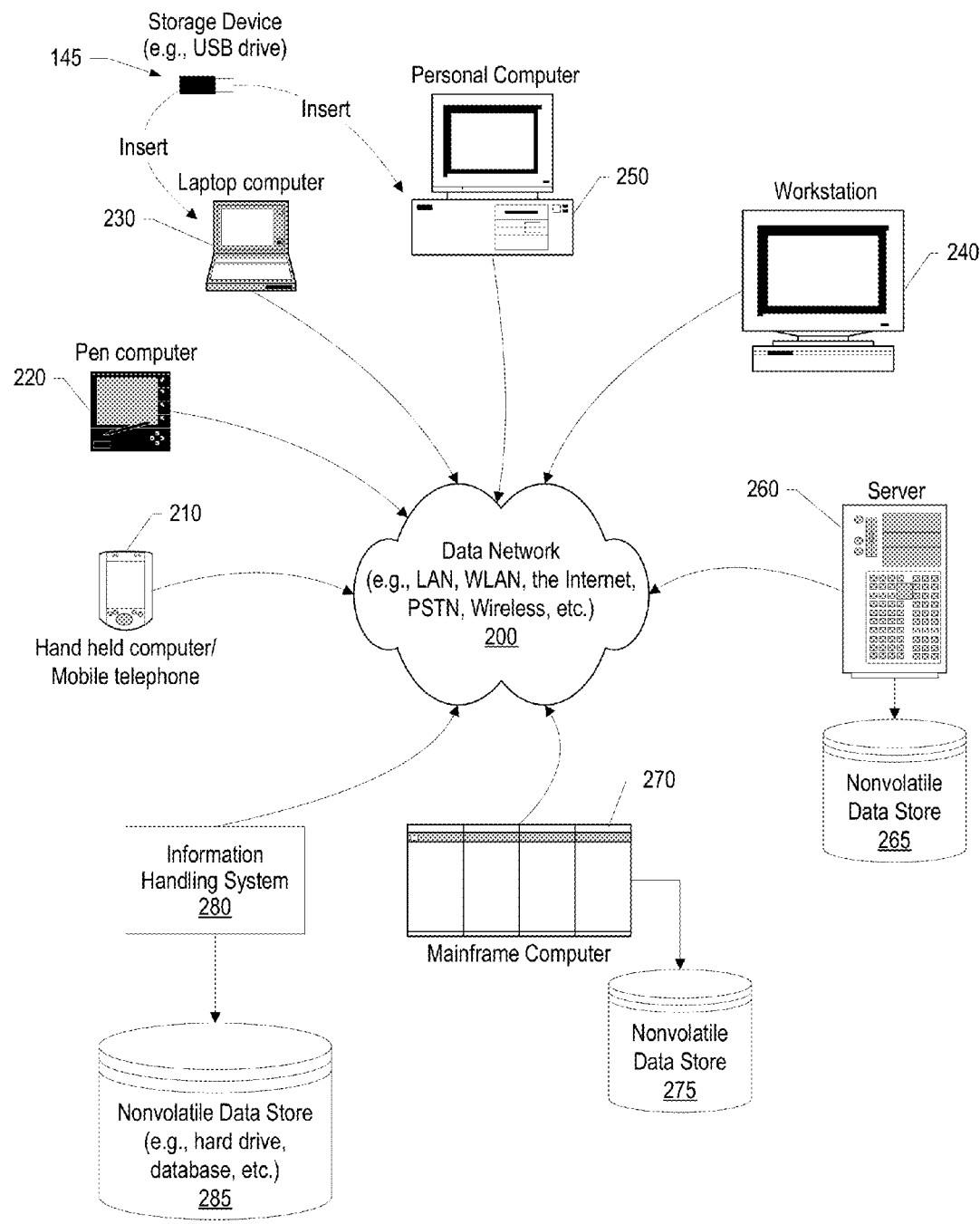
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 depict an approach that can be executed on an information handling system and computer network as shown in FIGS. 1-2. In this approach, community-based password metrics, such as strength of other passwords used by community members, age of passwords used by community members, etc. are compared to the user's password to ascertain how the user's password measures up to the passwords used by other members of the community, such as a social network, etc. This feedback is provided to the user without revealing any actual password data that pertains to other community members that might be used to access other users' accounts. This approach extends the space of mechanisms that inspire users to choose stronger passwords, by using information about passwords chosen by other members of the group (both currently and historically) to influence users to want to choose stronger/better passwords, for personal or communal reasons.

Figure 3:
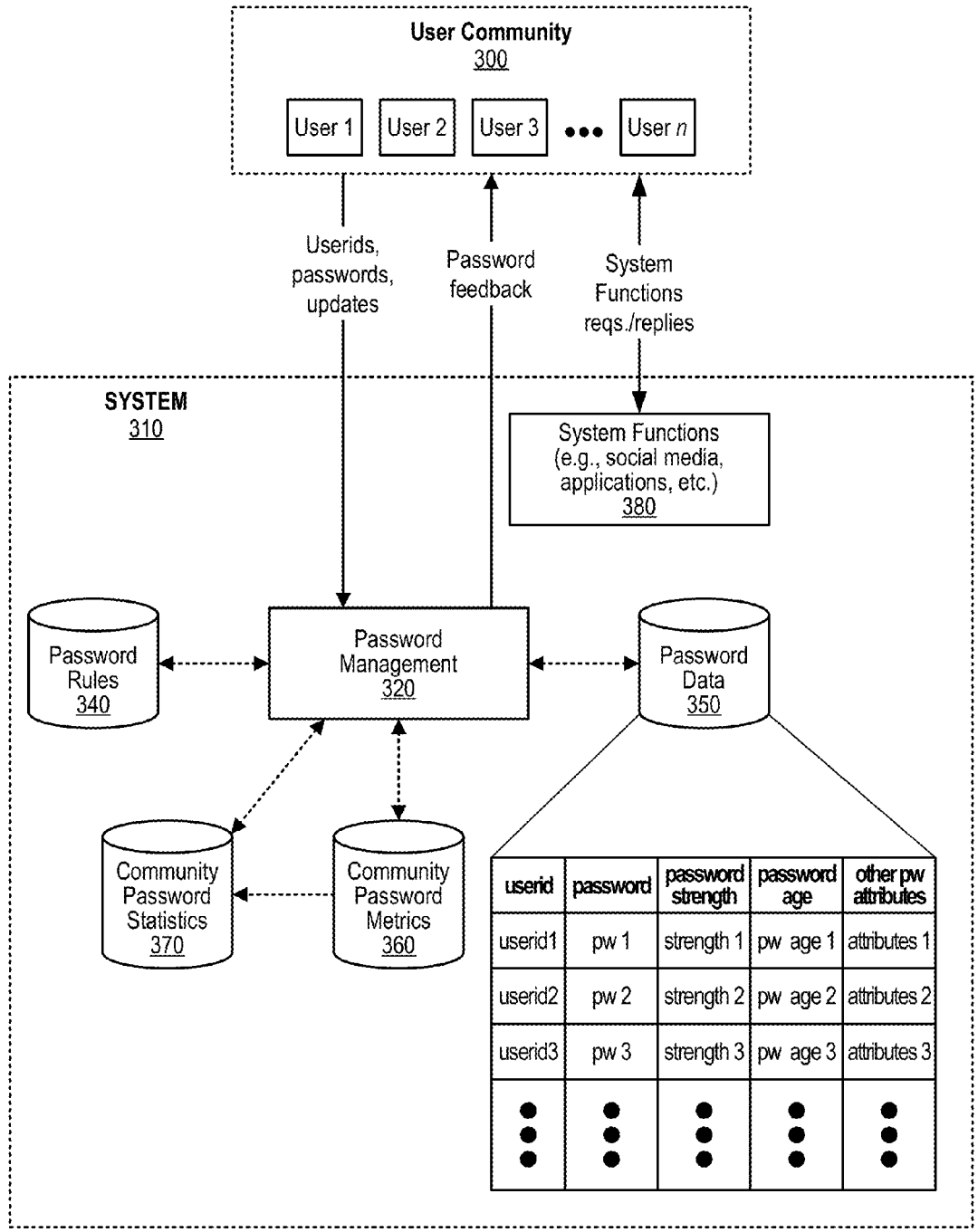
FIG. 3 is a component diagram that depicts a system that increases user password strength based on community-based data.

FIG. 3 is a component diagram that depicts a system that increases user password strength based on community-based data. User community 300, such as a social network, business, organization, or other user community includes a number of users, shown as User 1, User 2, User 3, and User n. Users in the user community generate various password events, such as when logging onto system 310 (authenticating the user), when setting a new password, when changing a password, when the password expires, and when the password strength of the user's password falls below a given threshold.

System 310, such as a social network, a business' computer system, an organization's computer system, and the like, includes password management component 320 which is a set of processes used to authenticate users to the system as well as manage user passwords. Password management component 320 utilizes password rules 340 to ascertain whether a password chosen by a user is acceptable. For example, the password rules may dictate that a password must have a certain number of characters, that a given number of the characters must be numeric, that a given number of characters must be capital, and that the password cannot be common words (such as "password," etc.). Password management component 320 maintains password data 350 which includes various password attributes, such as the password that is used to authenticate each of the users to the system, a password strength value corresponding to each of the passwords, a password age (or datestamp) indicating how long the password has been in use, and any number of other password attributes.

In addition, password management 320 identifies community password metrics (data store 360), such as the strength value of passwords used by community members, the ages of passwords used by community members, and the like. Community password metrics are identified by analyzing password data 350. Further, password management 320 computes a number of community password statistics (data store 370) based on the community password metrics. For example, community password statistics could include the average password strength value of community passwords as well as other statistical breakdowns of the password strength values (e.g., top ten percent, top quartile, lower quartile, lower ten percent, etc.), and average age of passwords as well as other statistical breakdowns of the password age values (e.g., top ten percent, top quartile, lower quartile, lower ten percent, etc.). These statistical values are used to provide password feedback. For example, the feedback might inform the user that the user's password falls in the lowest ten percent and that the age of the user's password is in the lower half. These statistical values might also be used as password rules to compel a user to change a password when the user's password attributes falls below acceptable community password statistics.

Password management component 320 authenticates the users to system 310. After being authenticated, the users can perform system functions 380, such as utilizing social media applications/functions in a social media environment, accessing business/organizational applications, etc.

Figure 4:
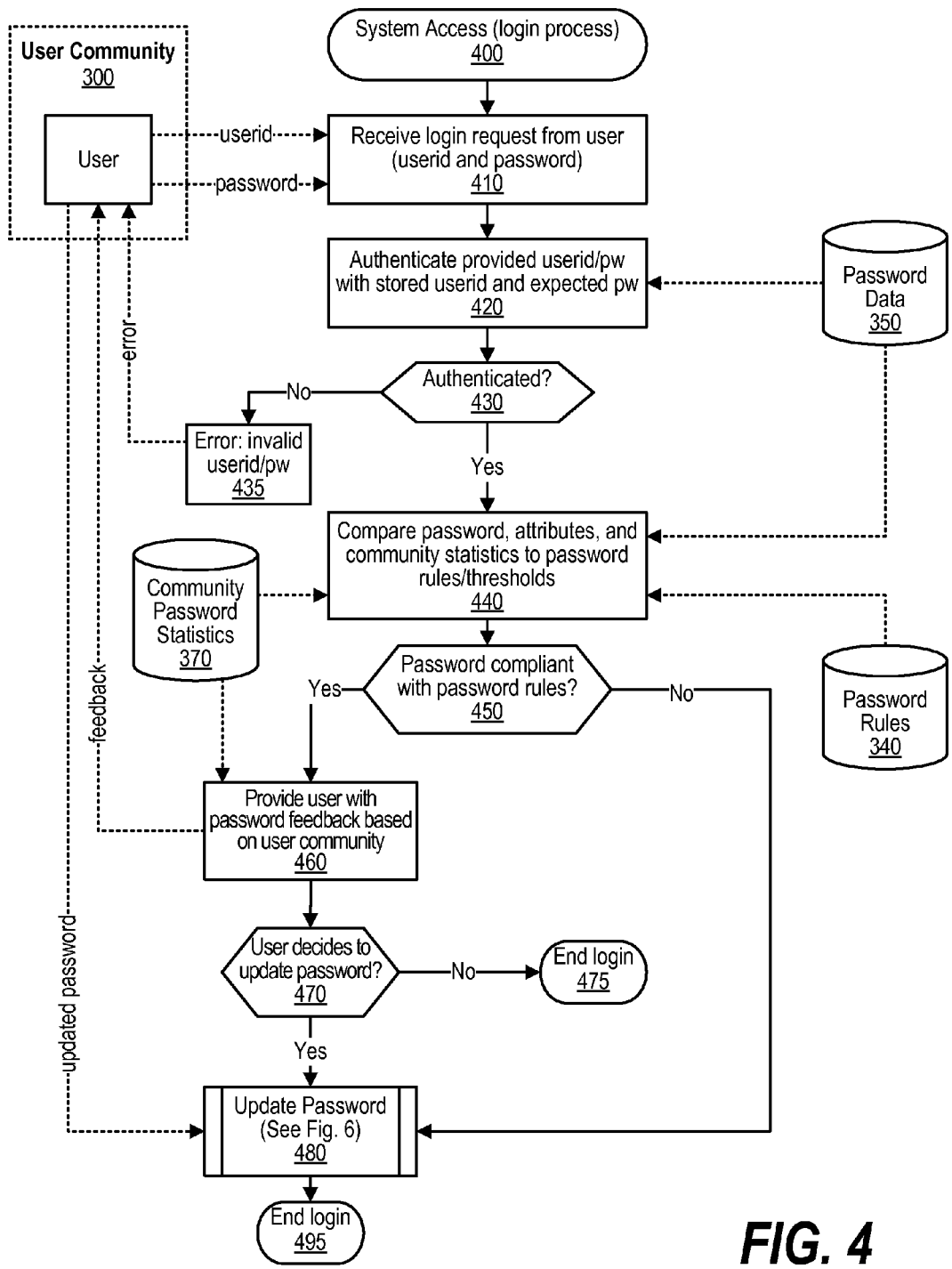
FIG. 4 is a depiction of a flowchart showing a login process that utilizes community-based data to increase password strength.

FIG. 4 is a depiction of a flowchart showing a login process that utilizes community-based data to increase password strength. Processing commences at 400 whereupon, at step 410, a login request is received by a user that is a member of user community 300. As previously discussed, user community 300 is a group of users, such as the users of a social network, users in a business or organization, etc. To logon to the system, the user provides the system with a user identifier (userid) and a password. At step 420, the system authenticates the provided user identifier and password by retrieving the user identifier and the expected password from data store 350. A determination is made as to whether the user is authenticated (decision 430). This determination is made based on whether the entered user identifier is found in data store 350 as well as whether the password provided by the user matches the expected password stored in data store 350. If the user is not authenticated (wrong user identifier and/or password provided by the user), then decision 430 branches to the "no" branch whereupon, at step 435, an error is sent to the user informing the user that the user identifier and/or password was not successfully authenticated. On the other hand, if the user is authenticated (a valid user identifier was provided and the password provided matched the expected password), then decision 430 branches to the "yes" branch to perform additional system access steps.

At step 440, the process compares the provided password, attributes (e.g., age, etc.) and community password statistics (from community password statistics data store 370) to any applicable password rules from rules data store 340. For example, a rule could be that passwords must be updated every ninety days or that a user's password needs to be updated when it is among the lowest of the community in terms of password strength. In this regard, one of the password attributes is a password strength that is calculated using one or more password strength attributes. In one embodiment, the password strength is previously determined (e.g., using a background process or at the time the password is updated) and this strength data is retained as an attribute in password data 350. So, at step 440 the process compares the identified strength of the user's password to one or more password strength metrics that correspond to the group of users. A determination is made as to whether the user's password is compliant with the password rules currently in place for the user community (decision 450).

If the user's password is compliant with the password rules currently in place for the user community, then decision 450 branches to the "yes" branch whereupon, at step 460, feedback is prepared and transmitted back to the user with the feedback being based on the comparison of the user's password attributes to the password attributes of the user community that was performed in step 440. The strength of the user's password in comparison to the password strength of the user community, as found in community password statistics data store 370, is provided to the user in this feedback. For example, the feedback may inform the user as to which quartile the user's password belongs in terms of strength as compared with the group of users in the user community (e.g., falls in top quartile, bottom quartile, etc.). Further and more detailed comparison data may also be provided. A determination is made as to whether the user wishes to update the password (decision 470), with the decision possibly based on the feedback that was provided to the user in step 460. If the user does not request to change the password, then decision 470 branches to the "no" branch whereupon the login process ends at 475 and the user is able to utilize the system (e.g., social network Web application, business application, etc.). If the user requests to change the password (with decision 470 branching to the "yes" branch) or if the user's password is not compliant with the password rules (with decision 450 branching to the "no" branch), then at predefined process 480, the user's password is updated using an update process that utilizes community-based password data (see FIG. 6 and corresponding text for further processing details). Login processing thereafter ends at 495.

Figure 5:
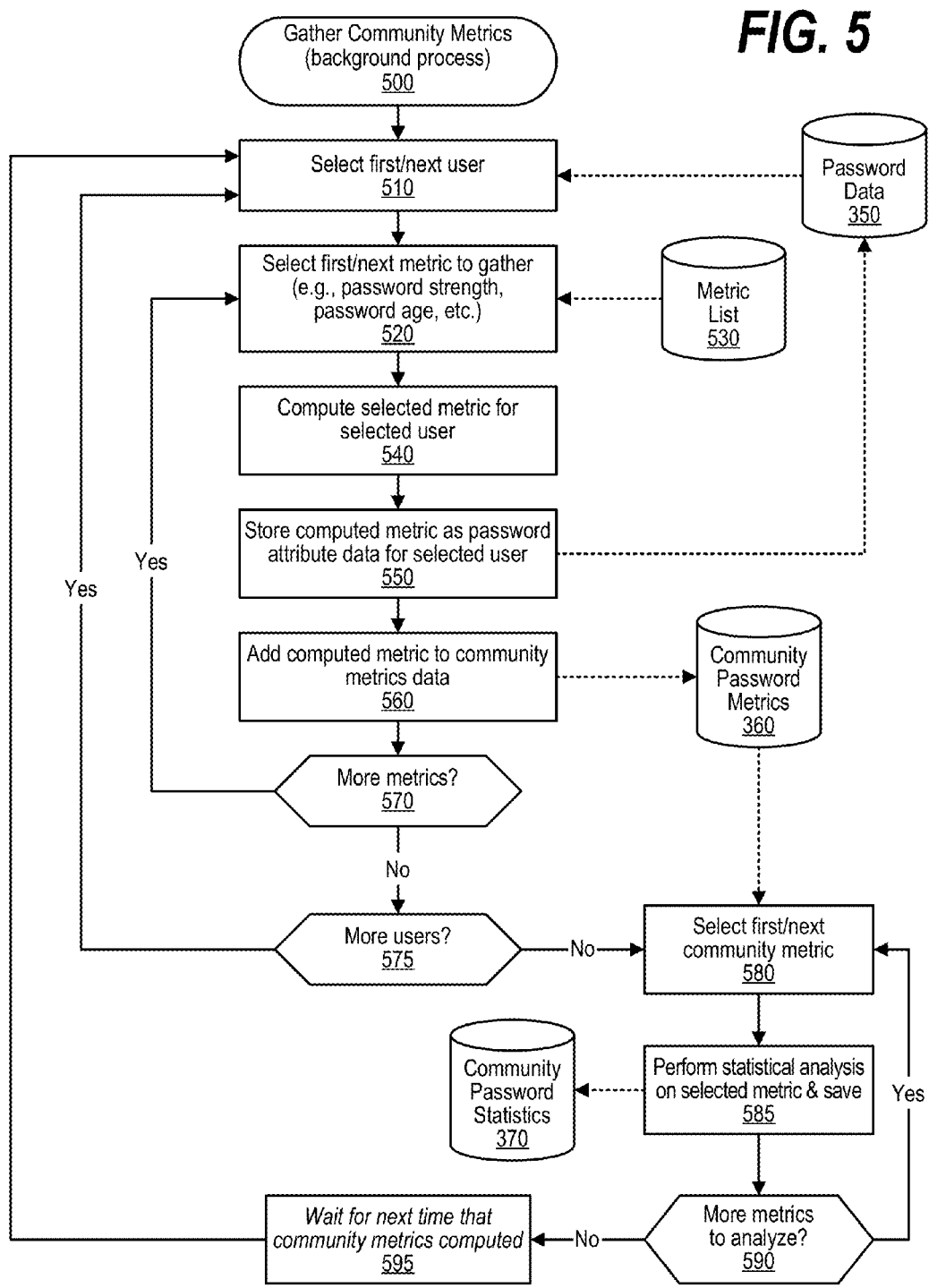
FIG. 5 is a depiction of a flowchart showing the logic used gather the community-based data metrics.

FIG. 5 is a depiction of a flowchart showing the logic used gather the community-based data metrics. Processing commences at 500. In one embodiment the process is a background process or otherwise performed when system resources are underutilized on an a separate system than the system that performs the main system functions so that system performance is not overly impacted. In the process, the data pertaining to each user is selected and metrics are computed. The resulting metrics are used to calculate community password metrics (data store 360). After the community password metrics are calculated, the metrics are used in a statistical analysis that results in community password statistics (data store 370).

At step 510 the data pertaining to the first user is selected from password data store 350. At step 520, the first metric that is being computed for each of the users is selected from metric list (data store 530). At step 540, the process computes the selected metric for the selected user (e.g., computing the password age of the password currently set for the selected user, computing the password strength of the password currently set for the selected user, etc.). At step 550, the computed metric is stored as a password attribute in the user's password data record (e.g., updating the password age, the password strength, etc.). In one embodiment, the metrics are performed when the password has changed especially if the metric values are types of values that do not change over time, thus preventing the password strength value from being repeatedly recalculated even though the password has not changed. At step 560, the computed metric is added to the community metrics that correspond to the group of users (data store 360). A determination is made as to whether there are additional metrics to select and calculate (decision 570). If there are additional metrics to select and calculate, then decision 570 branches to the "yes" branch which loops back to select and process the next metric for the selected user. This looping continues until all of the metrics that need to be calculated/updated have been selected and computed, at which point decision 570 branches to the "no" branch. A determination is made as to whether there are additional users in the group of users that comprise the user community that need to be selected and processed as described above (decision 575). If there are additional users to select and process, then decision 575 branches to the "yes" branch which loops back to select the password data corresponding to the next user and select/calculate the metrics for the newly selected user. This looping continues until all of the users have been selected and processed, at which point decision 575 branches to the "no" branch for further background processing.

After the community password metrics have been collected in data store 360, the process uses the password metrics to perform statistical analysis. At step 580, the first community metric (e.g., password strength, password age, etc.) is selected from data store 360. At step 585, the process performs a statistical analysis on the selected community metric and saves the resulting statistical analysis in data store 370. For example, analysis of the password strength metric will indicate the values that fall in the top ten percent, top quartile, bottom quartile, bottom ten percent, etc. A determination is made as to whether there are more community password metrics to analyze (decision 590). If there are additional community password metrics to analyze, then decision 590 branches to the "yes" branch which loops back to select and statistically analyze the next community metric. This looping continues until all of the password metrics have been selected and analyzed, at which point decision 590 branches to the "no" branch whereupon the process waits for the next time at which community metrics are computed (e.g., nightly, weekly, etc.). When the next time arrives, processing loops back to the beginning of the process (step 510) to perform the process and re-compute the metrics and generate updated community password statistics.

Figure 6:
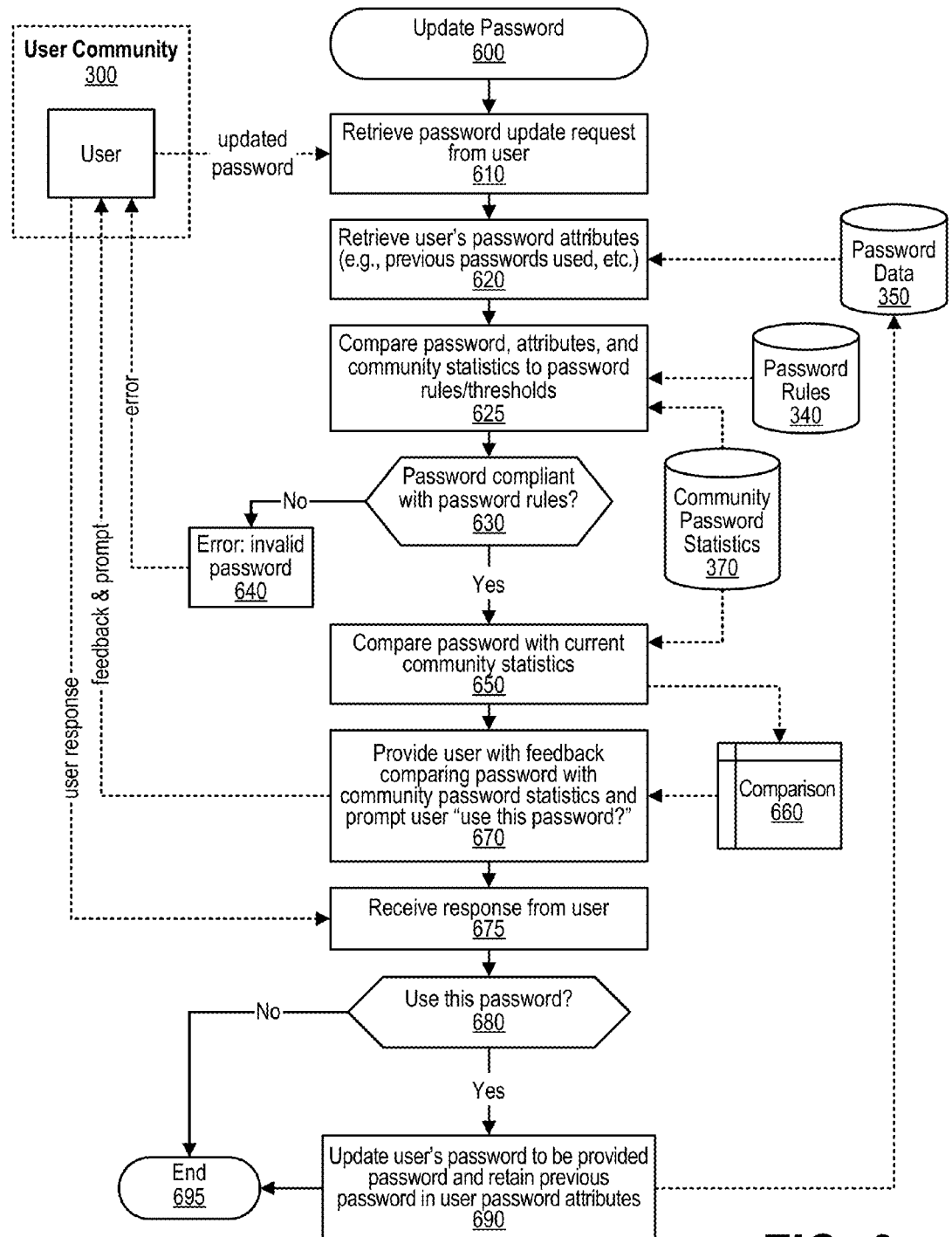
FIG. 6 is a depiction of a flowchart showing the logic used update a user's password utilizing the gathered community-based data metric to increase password strength.

FIG. 6 is a depiction of a flowchart showing the logic used update a user's password utilizing the gathered community-based data metric to increase password strength. The password update process commences at 600 whereupon, at step 610, the process receives a password update request from a user that is a member of user community 300. The password update request includes the new updated password that the user would like to have as the user's password. At step 620, the process retrieves the user's password attributes, such as a list of previous passwords used by the user, from password data store 350. At step 625, the process compares the password that is being requested by the user, the attributes of the requested password (e.g., number of times this password has been used, the strength of the password, etc.) as well as community statistics (e.g., number of times this password has been used by other members of the community, the strength of passwords used by other members of the community, etc.) to password rules that are in place for the user community (from data store 340). A determination is made as to whether the new password that is being requested by the user is in compliance with the password rules (decision 630). If the new password is not in compliance with the password rules, then decision 630 branches to the "no" branch whereupon, at step 640, an error is returned to the user and the new password is rejected. On the other hand, if the new password is in compliance with the password rules, then decision 630 branches to the "yes" branch in order to perform further password update processing.

At step 650, the new password that is being requested is compared to the current community password statistics from data store 370 and the comparison data is stored in memory 660. The password strength of the new password is computed and this strength value is compared to the strength of passwords currently being used by the group of users in the user community. At step 670, the comparison data is included in feedback that is transmitted back to the user. In addition, the feedback prompts the user as to whether, based on the feedback, the user still wants to use the new password. At step 675, a response to the prompt is received from the user. A determination is made as to whether the user wishes to use the new password after receiving the feedback (decision 680). If the response from the user is to use the new password, then decision 680 branches to the "yes" branch whereupon, at step 690, the user's password record in password data store 350 is updated with the new password. In addition, in one embodiment the user's old (replaced) password is retained as an attribute as a previously used password. On the other hand, if the response from the user is to not use the new password, then decision 680 branches to the "no" branch bypassing step 690. The password update routine thereafter ends at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method to increase password strength in a group of users, the method comprising:
    detecting a password event corresponding to a first user belonging to the group of users;
    in response to the detected password event, identifying one or more password strength metrics of a first user password that corresponds to the first user;
    comparing the one or more identified password strength metrics to one or more password strength metrics for a set of passwords, wherein respective passwords in the set of passwords correspond to respective ones of the group of users, and wherein the set of passwords and their respective password strength metrics are stored in a storage area;
    transmitting feedback to the first user, wherein the feedback is based on the password strength comparison; and
    receiving a password update from the first user that updates the first user password to a stronger password, wherein the password update is received in response to the transmitted feedback.

2. The method of claim 1, wherein the group of users is a group of users on a social network.

3. The method of claim 1, wherein the password event is an event selected from the group consisting of setting a new password, changing a password, authenticating a user, password expiration, and a password strength threshold.

4. The method of claim 1 further comprising:
    identifying one or more password strength factors pertaining to the first user password, wherein the feedback to the user includes the identified password strength factors.

5. The method of claim 1 further comprising:
    tracking a count of a number of times each unique password is used by the group of users, wherein one of the password strength metrics is based on the count of the associated password.

6. The method of claim 1 further comprising:
    identifying one or more password rules;
    comparing the first user password to the identified password rules;
    rejecting the first user password in response to the comparison revealing that the first user password violates at least one of the identified password rules; and accepting the first user password in response to the comparison revealing that the first user password complies with the identified password rules.

7. The method of claim 1 wherein the password strength metrics are selected from the group consisting of a password strength value, a password age, and a count of times a password is used by the group of users.

8. An information handling system comprising:
one or more processors;
a memory coupled to at least one of the processors;
a set of instructions stored in the memory and executed by at least one of the processors to increase password strength, wherein the set of instructions perform actions of:
  detecting a password event corresponding to a first user belonging to a group of users;
  in response to the detected password event, identifying one or more password strength metrics of a first user password that corresponds to the first user;
  comparing the one or more identified password strength metrics to one or more password strength metrics for a set of passwords, wherein respective passwords in the set of passwords correspond to respective ones of the group of users, and wherein the set of passwords and their respective password strength metrics are stored in a storage area;
  transmitting feedback to the first user, wherein the feedback is based on the password strength comparison; and
  receiving a password update from the first user that updates the first user password to a stronger password, wherein the password update is received in response to the transmitted feedback.

9. The information handling system of claim 8, wherein the password event is an event selected from the group consisting of setting a new password, changing a password, authenticating a user, password expiration, and a password strength threshold.

10. The information handling system of claim 8 wherein the actions further comprise:
  identifying one or more password strength factors pertaining to the first user password, wherein the feedback to the user includes the identified password strength factors.

11. The information handling system of claim 8 wherein the actions further comprise:
  tracking a count of a number of times each unique password is used by the group of users, wherein one of the password strength metrics is based on the count of the associated password.

12. The information handling system of claim 8 wherein the actions further comprise:
  identifying one or more password rules;
  comparing the first user password to the identified password rules;
  rejecting the first user password in response to the comparison revealing that the first user password violates at least one of the identified password rules; and
  accepting the first user password in response to the comparison revealing that the first user password complies with the identified password rules.

13. The information handling system of claim 8 wherein the password strength metrics are selected from the group consisting of a password strength value, a password age, and a count of times a password is used by the group of users.

14. A computer program product stored in a computer readable storage device, comprising computer instructions that, when executed by an information handling system, causes the information handling system to increase password strength in a group of users by performing actions comprising:
  detecting a password event corresponding to a first user belonging to the group of users;
  in response to the detected password event, identifying one or more password strength metrics of a first user password that corresponds to the first user;
  comparing the one or more identified password strength metrics to one or more password strength metrics for a set of passwords, wherein respective passwords in the set of passwords correspond to respective ones of the group of users, and wherein the set of passwords and their respective password strength metrics are stored in a storage area;
  transmitting feedback to the first user, wherein the feedback is based on the password strength comparison; and
  receiving a password update from the first user that updates the first user password to a stronger password, wherein the password update is received in response to the transmitted feedback.

15. The computer program product of claim 14, wherein the group of users is a group of users on a social network.

16. The computer program product of claim 14, wherein the password event is an event selected from the group consisting of setting a new password, changing a password, authenticating a user, password expiration, and a password strength threshold.

17. The computer program product of claim 14 wherein the actions further comprise:
  identifying one or more password strength factors pertaining to the first user password, wherein the feedback to the user includes the identified password strength factors.

18. The computer program product of claim 14 wherein the actions further comprise:
  tracking a count of a number of times each unique password is used by the group of users, wherein one of the password strength metrics is based on the count of the associated password.

19. he computer program product of claim 14 wherein the actions further comprise:
  identifying one or more password rules;
  comparing the first user password to the identified password rules;
  rejecting the first user password in response to the comparison revealing that the first user password violates at least one of the identified password rules; and
  accepting the first user password in response to the comparison revealing that the first user password complies with the identified password rules.

20. The computer program product of claim 14 wherein the password strength metrics are selected from the group consisting of a password strength value, a password age, and a count of times a password is used by the group of users.

* * * * *